(12) United States Patent
Bradford et al.

(10) Patent No.: US 7,523,135 B2
(45) Date of Patent: Apr. 21, 2009

(54) RISK AND COMPLIANCE FRAMEWORK

(75) Inventors: Teresa Ann Bradford, Wake Forest, NC (US); Paul Ronald Friedberg, Newton, MA (US); Lawrence Warner Gosselin, Alpharetta, GA (US); Lisa Brucoli Leahy, Carmel, IN (US); David Medina, Coral Springs, FL (US); Jurij R. Paraszczak, Pleasantville, NY (US); Frederik Soendergaard-Jensen, New Milford, CT (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 11/254,360

(22) Filed: Oct. 20, 2005

(65) Prior Publication Data

US 2007/0094284 A1    Apr. 26, 2007

(51) Int. Cl.
G06F 7/00 (2006.01)
G06F 17/00 (2006.01)
G06Q 10/00 (2006.01)
G06Q 30/00 (2006.01)

(52) U.S. Cl. .................. 707/104.1; 705/1; 707/200

(58) Field of Classification Search .............. 707/200, 707/104.1; 705/1
See application file for complete search history.

(56) References Cited

U.S. PATENT DOCUMENTS

| | | | |
|---|---|---|---|
| 6,341,287 B1* | 1/2002 | Sziklai et al. ............... 707/102 |
| 6,557,009 B1* | 4/2003 | Singer et al. ............. 707/104.1 |
| 6,654,788 B1* | 11/2003 | Chance et al. .............. 709/206 |
| 6,898,581 B1* | 5/2005 | Cordery et al. ............ 705/400 |
| 6,907,399 B1* | 6/2005 | Cordery et al. ................ 705/1 |
| 6,970,862 B2* | 11/2005 | Kwan ............................ 707/3 |
| 7,013,290 B2* | 3/2006 | Ananian ...................... 705/27 |
| 7,020,634 B2* | 3/2006 | Khaishgi et al. ............. 705/50 |
| 7,155,414 B2* | 12/2006 | Barritz et al. ................ 705/59 |
| 2001/0029579 A1* | 10/2001 | Kusakabe et al. ........... 713/172 |
| 2002/0022982 A1* | 2/2002 | Cooperstone et al. ......... 705/7 |
| 2002/0023109 A1* | 2/2002 | Lederer et al. .............. 707/511 |
| 2002/0111811 A1* | 8/2002 | Bares et al. ................. 704/275 |
| 2002/0123957 A1* | 9/2002 | Notarius et al. .............. 705/37 |
| 2002/0138417 A1* | 9/2002 | Lawrence .................... 705/38 |
| 2002/0161778 A1* | 10/2002 | Linstedt ...................... 707/102 |
| 2002/0184068 A1* | 12/2002 | Krishnan et al. ............... 705/8 |
| 2003/0069894 A1* | 4/2003 | Cotter et al. ............. 707/104.1 |
| 2003/0217036 A1* | 11/2003 | Haunschild et al. ............ 707/1 |
| 2004/0102922 A1* | 5/2004 | Tracy et al. ................. 702/181 |

(Continued)

OTHER PUBLICATIONS

HiSoftware, Enabling Content & Application Quality Testing, Test Management, and Remediation, Sep. 22, 2004.*

(Continued)

*Primary Examiner*—James Trujillo
*Assistant Examiner*—Jorge A Casanova
(74) *Attorney, Agent, or Firm*—John R. Pivnichny; Dillon & Yudell LLP

(57) ABSTRACT

A method, system and computer-usable medium are presented for coordinating an enterprise's resources needed for regulation/standards compliance. The method includes the establishment of a common data framework that includes multiple data structures for multiple applications, selection of a regulation to be complied with by an enterprise, determination of which data is needed by the enterprise to be in compliance with the regulation, and extraction of needed data for compliance from the common data structure

19 Claims, 19 Drawing Sheets

U.S. PATENT DOCUMENTS

| | | | |
|---|---|---|---|
| 2004/0107124 A1* | 6/2004 | Sharpe et al. | 705/7 |
| 2004/0139053 A1* | 7/2004 | Haunschild | 707/1 |
| 2004/0167894 A1* | 8/2004 | Ziv | 707/9 |
| 2004/0193907 A1* | 9/2004 | Patanella | 713/200 |
| 2004/0205057 A1* | 10/2004 | Hutchison et al. | 707/3 |
| 2004/0225763 A1* | 11/2004 | Carroll et al. | 710/36 |
| 2004/0243391 A1* | 12/2004 | Nelson et al. | 704/2 |
| 2004/0243881 A1* | 12/2004 | Wang et al. | 714/37 |
| 2004/0266533 A1* | 12/2004 | Gentles et al. | 463/42 |
| 2005/0065941 A1* | 3/2005 | DeAngelis et al. | 707/100 |
| 2005/0066021 A1* | 3/2005 | Megley | 709/223 |
| 2005/0197937 A1* | 9/2005 | Fanous et al. | 705/35 |
| 2005/0197952 A1* | 9/2005 | Shea et al. | 705/38 |
| 2005/0288994 A1* | 12/2005 | Haunschild | 705/11 |
| 2006/0034434 A1* | 2/2006 | Kashi | 379/93.07 |
| 2006/0085403 A1* | 4/2006 | Harrison et al. | 707/3 |
| 2006/0085852 A1* | 4/2006 | Sima | 726/22 |
| 2006/0129441 A1* | 6/2006 | Yankovich et al. | 705/8 |
| 2007/0011134 A1* | 1/2007 | Langseth et al. | 707/1 |

OTHER PUBLICATIONS

HiSoftware, AccVerify and AccRepair are Complete Web Testing Solutions, Sep. 22, 2004.*

Bolsdon et al., An object-based approach to a road network definition for an accident database, 1999, Elsevier Science Ltd., pp. 1-16.*

\* cited by examiner

FIG. 1a

| Classification | Concepts contained within | Examples |
|---|---|---|
| Corporate Governance | • Financial Reporting<br>• Transparency<br>   o Business Controls<br>   o Accountability<br>   o Corporate and Accounting Fraud<br>• Disclosure<br>   o Financial Transactions<br>   o Material Events<br>   o Safety Information / Recalls | 1. SOX<br>2. SEC Act of 1933, 1934<br>3. TREAD<br>4. IAS |
| Business Improvement | • Risk Mitigation<br>• Regulatory Capital Requirements<br>• Engineering Models | 1. Basel II<br>2. CMMI<br>3. ISO 9000 |
| Business Resilience | • Disaster Recovery<br>• Availability | 1. NFPA 1600<br>2. Check 21 |
| Transaction Integrity | • Anti-Money Laundering<br>• Anti-Terrorism<br>• Broker Surveillance<br>• Electronic Signatures | 1. NASD 3010/3110<br>2. NASD 2711<br>3. NYSE 472<br>4. 21 CFR 11<br>5. Patriot Act |
| Information Protection | • Security<br>• Privacy | 1. HIPAA<br>2. GLBA<br>3. SB 1386<br>4. EU Data Privacy<br>5. FOIA<br>6. ISO 17799<br>7. NERC 1200 UAS |
| Information Lifecycle Management | • Information Management Standards<br>• Retention Requirements<br>• Recordkeeping Standards | 1. OMB A-130<br>2. SOX<br>3. SEC 17a-4<br>4. DOD 5015.2<br>5. PRO 2<br>6. MoREQ<br>7. VERS<br>8. DOMEA<br>9. NOARK |

102

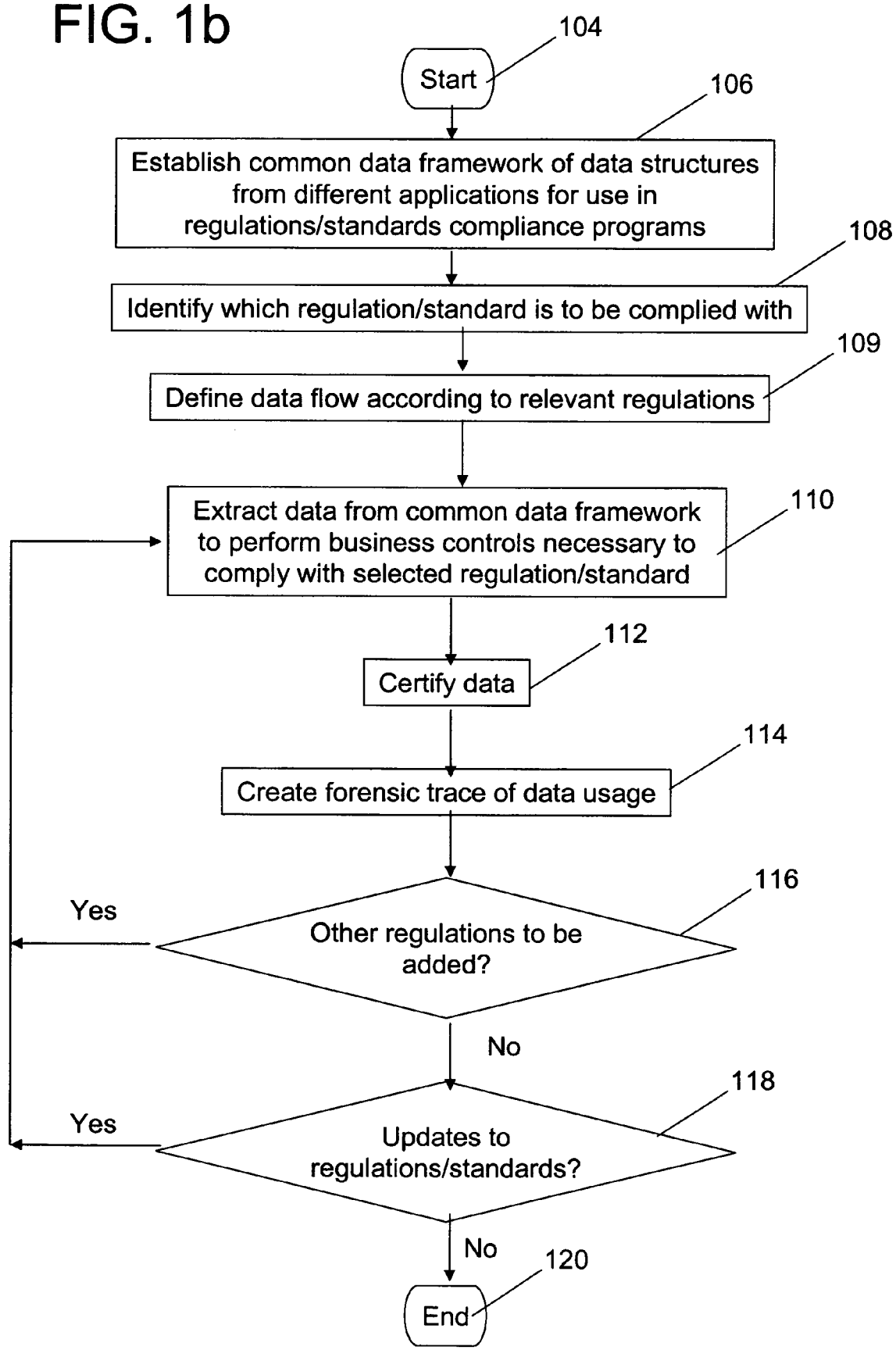

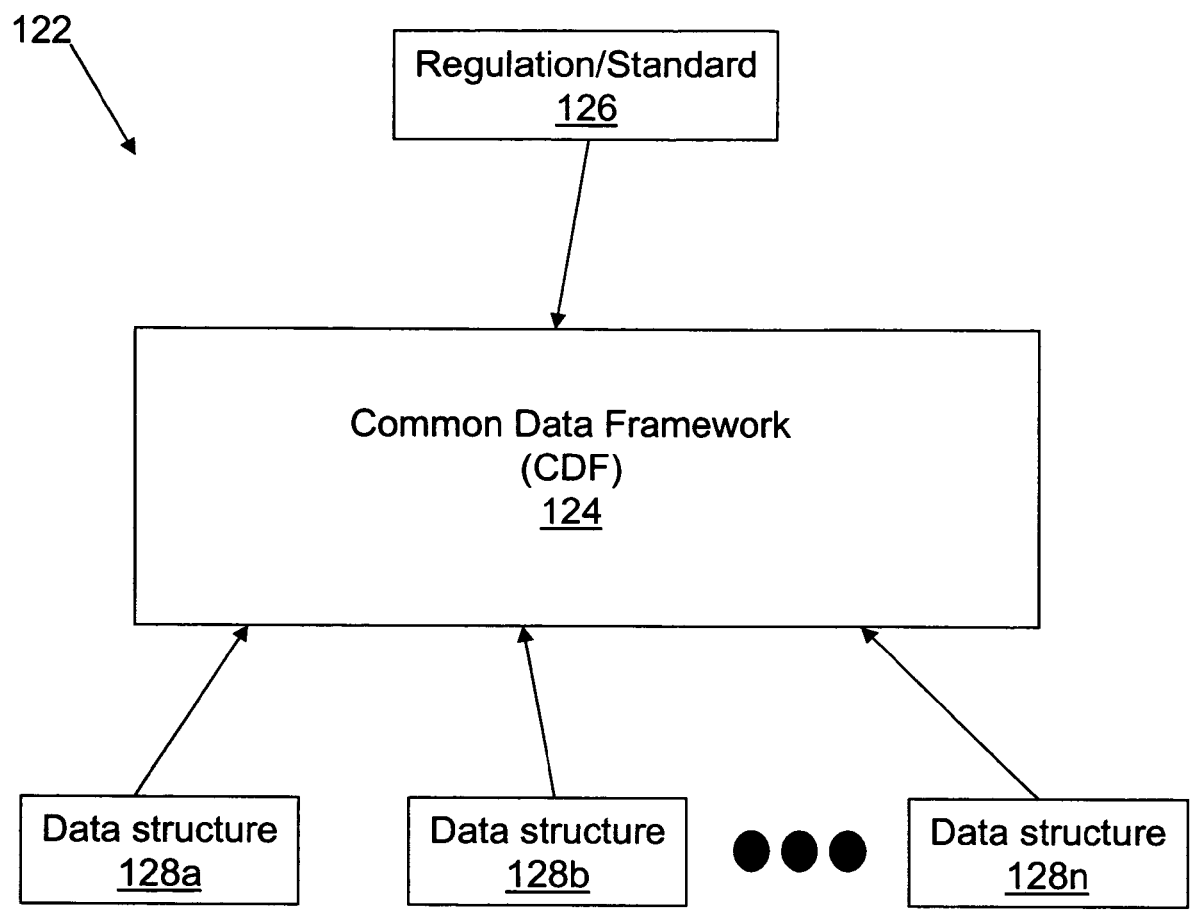

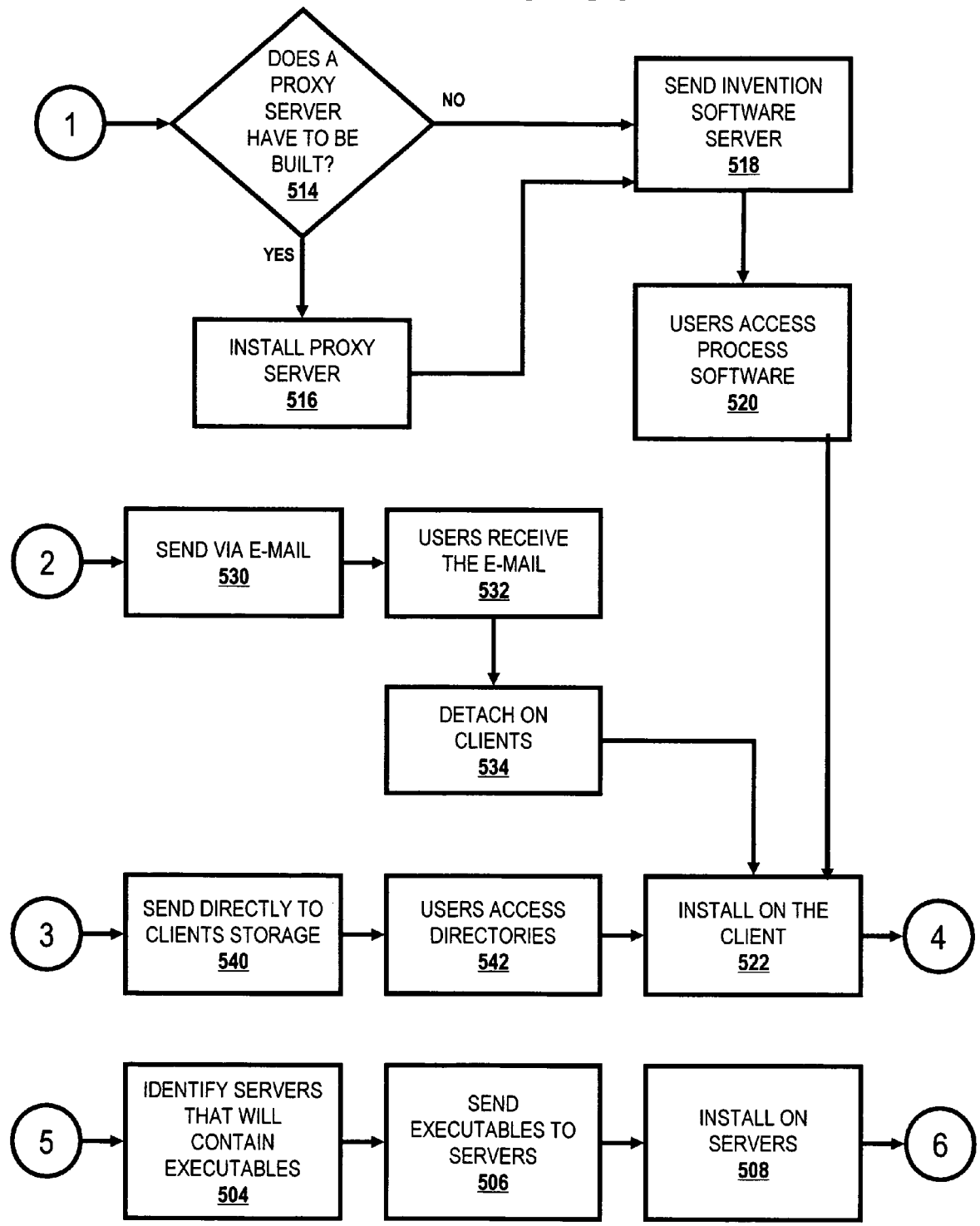

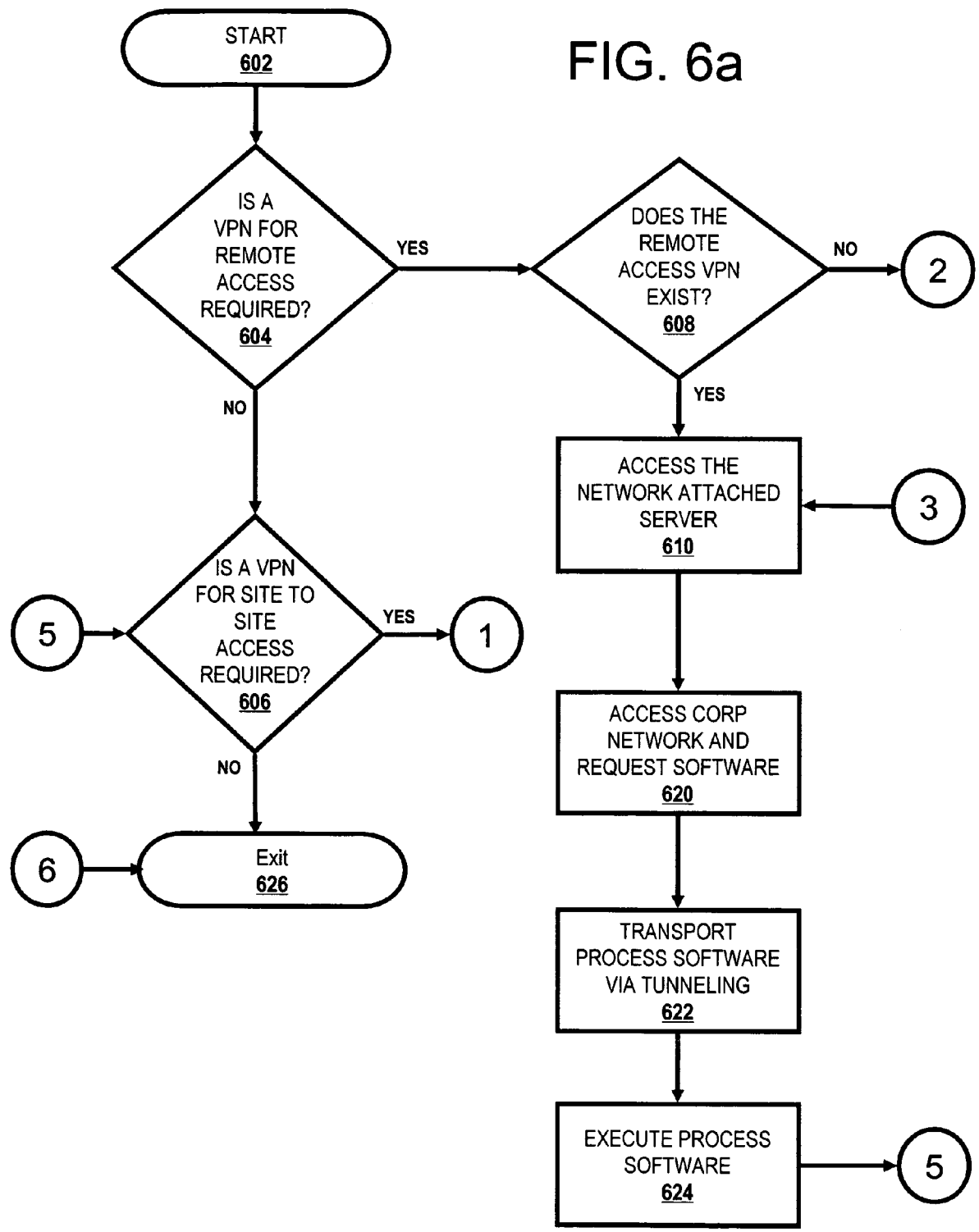

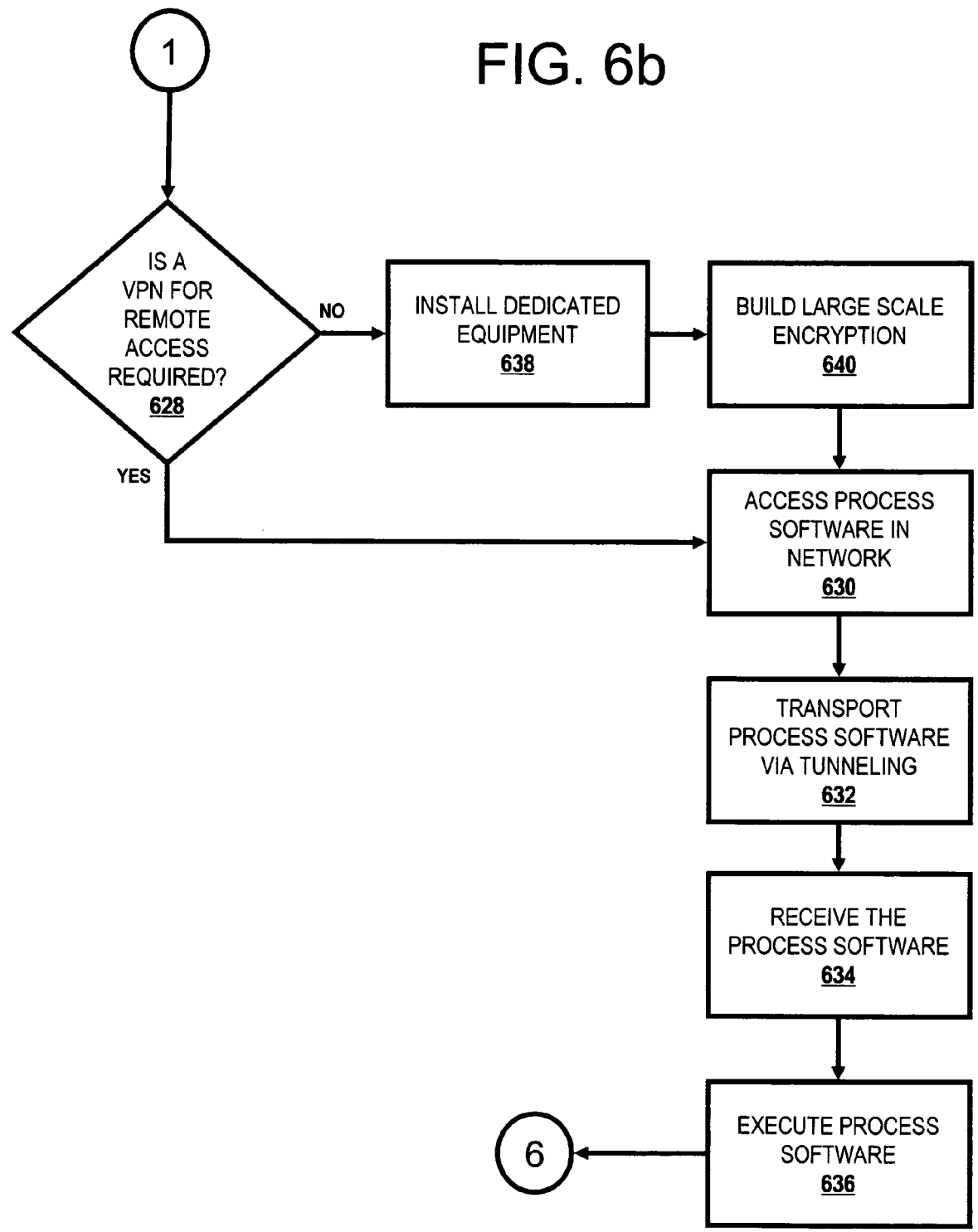

RISK AND COMPLIANCE FRAMEWORK

BACKGROUND OF THE INVENTION

1. Technical Field

The present invention relates in general to the field of computers and similar technology systems, and in particular to software utilized by such systems to implement methods and processes. Still more particularly, the present invention relates to a computer-implementable method and system for coordinating data structures to populate, manage and enable regulatory compliance applications through a single infrastructure that adapts to existing and future compliance requirements.

2. Description of the Related Art

Enterprises face an alphabet soup of regulatory requirements that are continually being propagated and amended by federal, state and local governments, as well as other regulatory bodies. Such regulatory requirements include those promulgated by the U.S. government, including the Sarbanes-Oxley Act (SOX), the Patriot Act, the Occupational Safety and Health Act (OSHA), the Bank for International Settlements' Basel Committee "Basel II" regulation for the banking industry, the Health Insurance Portability and Accountability Act (HIPAA), etc. While some regulations are industry specific (e.g., OSHA CFR 1926 standards apply only to the construction industry), others are cross-industry regulations (e.g., OSHA CFR 1910 standards).

Besides governmental regulations, enterprises also must comply with industry standards, such as accreditation requirements from the Joint Commission on Accreditation of Hospitals (JCAH) for hospitals and nursing homes; the International Organization for Standardization's ISO 9000 et seq. standards for manufacturing and other industries, etc.

Besides the difference in promulgating bodies (i.e., governments promulgate regulations while private organizations promulgate standards), regulations tend to be more nebulous than standards. That is, regulations tend to require an enterprise to achieve a final result (e.g., HIPAA's requirement that an employer must keep employee's health records confidential), but without expressly stating how such results are to be achieved. Furthermore, regulations often involve some sort of governmental enforcement agency that is able to levy fines and/or criminal penalties for non-compliance. Standards, on the other hand, tend to be more prescriptive in nature, and often provide model formats and procedures that are to be followed to be in compliance with the standard.

Whether an enterprise is attempting to comply with a regulation or a standard, some degree of decision making is required by the enterprise on how to come into compliance. As a result, most enterprises attack the problem of compliance in a piecemeal manner. That is, to come into compliance with a first governmental regulation, an enterprise will typically establish a top-level strategy created by upper management. A committee is often formed to establish the processes and policies needed to come into compliance, as well as determining what infrastructure (including hardware and software) are needed. After multiple iterations, a program is set-up, but often becomes stale (outdated) as soon as amendments are made to the regulation. If the committee still has ownership of the process, then the program may or may not be updated to comport with the updates to the regulation.

When the enterprise decides to come into compliance with a second governmental regulation (or an industry standard), the process starts all over again to create a second compliance program. Besides "reinventing the wheel" for aspects of the first compliance program that were already established during the first governmental regulation compliance program, the second program may cause conflicts (e.g., conflicting policies, procedures, resource usage, etc.) with the first program.

The documentation requirements of regulations and standards are considerable. Such documentation must often be in a mandated format, which is populated with specific data related to an enterprise's operations. Thus, a typical approach to compliance with one or more such regulations/standards is extremely costly, both in hardware/software resources as well as in labor/implementation costs. Again, adhering to compliance-related requirements becomes an additional challenge as new regulations are introduced, vaguely written regulations need to be interpreted, multiple regulations overlap and contradict one another, and existing regulations change.

SUMMARY OF THE INVENTION

Recognizing the challenges presented by enterprise regulations and standards, the present invention presents a method, system and computer-implementable medium for coordinating an enterprise's resources needed for present and future regulation/standards compliance. The method includes: defining a common data framework that includes multiple data structures derived from separate applications and data sources within an enterprise; identifying a regulation which the enterprise is to comply with; determining specific data required by the enterprise to be in compliance with the regulation; and extracting needed data for compliance from the common data framework.

In one embodiment, a Graphical User Interface (GUI) graphically depicts which data structures are needed to place the enterprise in compliance with the regulation. An on-screen menu for at least one data structure depicted in the GUI is provided, wherein the on-screen menu depicts at least one software application available from a vendor that provides the at least one data structure needed to place the enterprise in compliance with the regulation The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 1*a* is a table showing a relationship between different regulations/standards' classifications;

FIG. 1*b* is a flow-chart of exemplary steps taken to establish a risk and compliance framework for an enterprise;

FIG. 1*c* depicts exemplary components of a Risk and Compliance Framework;

FIGS. 5a-b show a flow-chart of steps taken to deploy software capable of executing the steps shown and described in FIGS. 1b-2d;

FIGS. 6a-c show a flow-chart of steps taken to deploy in a Virtual Private Network (VPN) software that is capable of executing the steps shown and described in FIGS. 1b-2d;

DETAILED DESCRIPTION OF THE PREFERRED EMBODIMENT

Figure 1D:
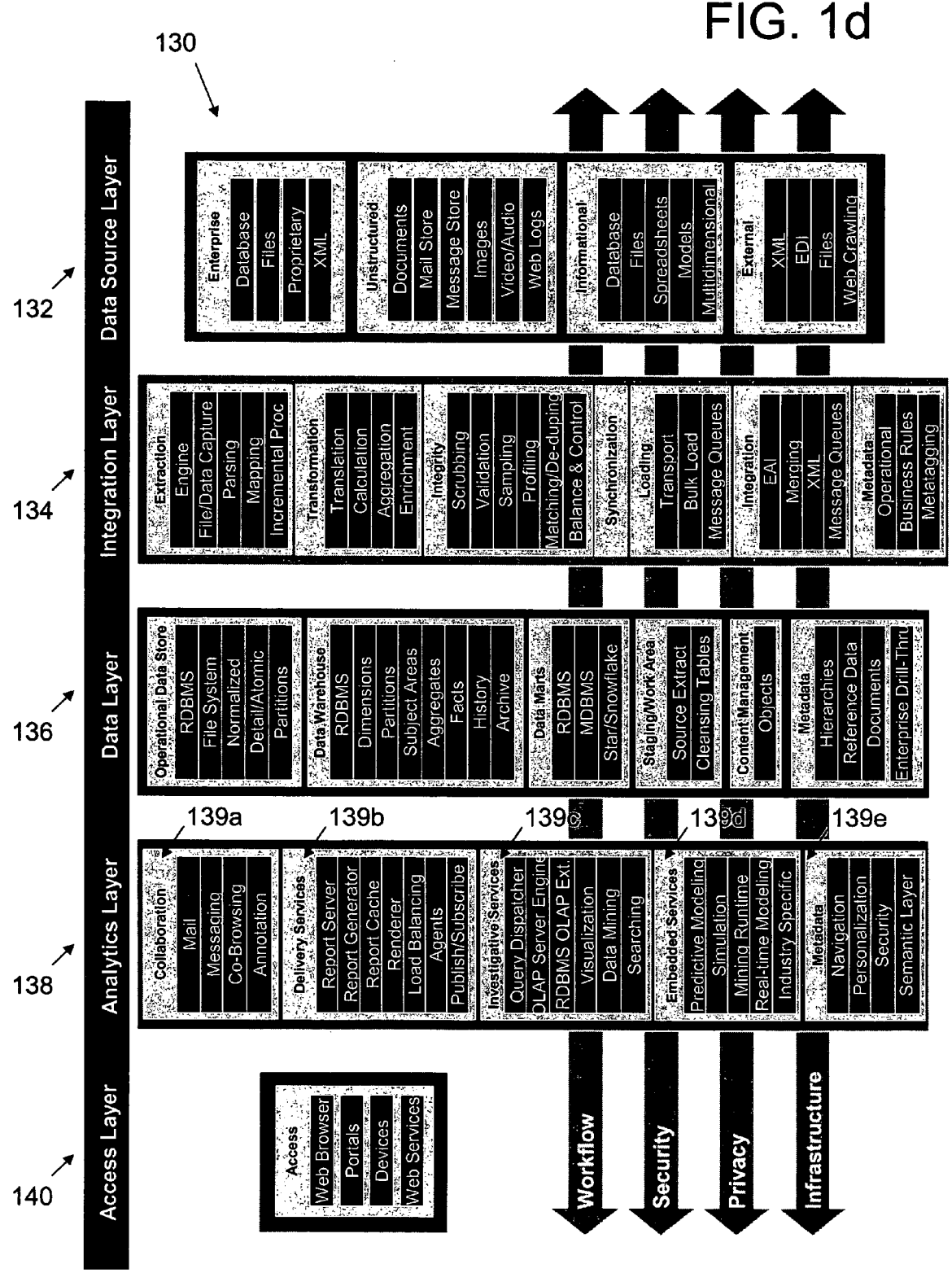
FIG. 1*d* illustrates a preferred data layer organization in accordance with the present invention.

This invention presents a framework designed to illustrate the infrastructure capabilities needed to help address the myriad of compliance requirements facing organizations today. Using the framework, organizations can standardize on the use of common technologies to design and deploy a compliance architecture that may help them deal more effectively with compliance initiatives. The framework provides a holistic view of data and processes required for regulatory (regulations and/or standards) compliance. The major components or candidate building blocks of an end-to-end solution are described using a common language that facilitates collaboration between intra-enterprise entities as well as between and enterprise and outside resources.

Compliance with a regulation or standard is defined as a management function that helps organizations respect and abide by all applicable legislative regulations, standards, codes and business policies, focusing primarily on ensuring that an appropriate tradeoff is made between the risk of not complying and the cost of ensuring compliance. That is, compliance is essentially a mandate for organizations to implement business processes that ensure the protection of the public good.

As such, compliance with any regulation (or standard) requires interpreting what the regulation says, understanding where an enterprise stands with respect to compliance, documenting a plan for achieving compliance, executing the plan, and devising measures and controls to prove that the plan has been implemented.

With reference now to the figures, and in particular to FIG. 1a chart 102 depicts six representative classifications of regulation/standard types found in the presently presented Risk and Compliance Framework. These classifications are: Corporate Governance, Business Improvement, Business Resilience, Transaction Integrity, Information Protection, and Information Lifecycle Management. Chart 102 also presents which concepts are contained within each classification, as well as examples of regulations and standards that fall under each particular classification. Note some regulations may be relevant to multiple classifications. For example, the Sarbanes-Oxley Act (SOX) is relevant to both "Corporate Governance" as well as "Information Lifecycle Management."

Referring now to FIG. 1b, a flow-chart is presented showing exemplary steps in establishing and using the inventive Risk and Compliance Framework. After initiator block 104, a common data framework for the Risk and Compliance Framework is established (block 106). This common data framework is preferably a federated data structure, in which data is physically stored in separate files, folders, partitions, servers and/or physical locations, but is logically connected through the use of flags, pointers or other logical connectors. The common data framework may also include data structures from different applications. For example, a first application may include a database of accidents suffered by or within an enterprise. A second application may include employee records. However, a third application may be a "retention" application, which defines how long accident and employee records must be retained by the enterprise. This "retention" application is one of the "coordinating" applications used by the Risk and Compliance Framework to interface and coordinate between a regulation and its requirements and data structures found in the common data structure framework.

For example, as shown in FIG. 1c, a Risk and Compliance Framework 122 includes a Common Data Framework (CDF) 124. CDF 124 is able to extract, based on a Regulation/Standard 126, data from different data structures 128a-n, which may be data structures generated by different applications, such as Human Resources Applications, Internal Business Policies, Employee Records, Retention Policy Programs, Customer Databases, etc.

Returning to FIG. 1b, at step 108, which regulation/standard is to be complied with by the enterprise is identified. For example, an enterprise may determine that it needs to be in compliance with the Sarbanes-Oxley Act (SOX), which will be used in the example shown in FIGS. 2a-d.

As depicted at block 109, the sequence of data movement (data flow) relevant to the specific identified regulation is defined. For example, to ensure that a final accounting of revenue of a global enterprise is valid, data from all of the remote locations must be gathered and positioned at the relevant locations in the accounting scheme and validated at each stage.

Data from the common data structure is then extracted (block 110) according to needs defined by the Risk and Compliance Framework for the selected regulation(s). The extracted data is certified (block 112) as being unaltered. That is, the extracted data is certified as being that data which comports with the requirements of the regulation, as containing the proper data, and preferably being in the proper format if such format is required by the regulation.

Forensics are performed on the extracted data (block 114), to include a generation of a report (forensic trace of data usage) confirming that the certified data is uncompromised (i.e., valid and unaltered). For example, there may be software/procedures are in place which make alteration of data and/or timestamps for when data was created difficult, if not impossible, to alter. Thus, a copy of all e-mails for a particular time period may be stored on a "write once" optical disk, which is then stored in a location available only to specified security-cleared individuals.

If any more regulations or standards are to be complied with (added) by the enterprise (query block 116), or if existing regulations/standards are updated (query block 118), then the process returns to block 110 to bring the enterprise into compliance status with the new/revised regulation/standard. Otherwise, the process ends at terminator block 120.

With reference now to FIG. 1d, data used for regulation/standard compliance is preferably organized in a layer structure 130, organized from right to left with a data source layer 132 as the "lowest" layer and an access layer 140 as the "highest" layer.

Data source layer 132 includes actual data that will be used in an enterprise's regulation/standard compliance program. Data in data source layer 132 includes an enterprise's proprietary and other data, as well as unstructured, informational, and external data as depicted and described. Thus, unstructured data includes documents, mail store, message store, images, video/audio and web logs. Informational data includes that in non-enterprise databases, files, spreadsheets, models and multidimensional files. Other external files include XML, EDI and web crawling files.

Data source layer 132 interfaces with an integration layer 134, which integrates data from data source layer 132 into data layer 136, which will ultimately be used by the enterprise's compliance program.

Within integration layer 134 are extraction, transformation, integrity, synchronization, loading, integration and metadata files. Extraction files include an extraction engine, file/data capture software, parsing code, mapping code, and pre-defined incremental procedures. Transformation files include translation, calculation, aggregation and enrichment files used to manipulate the data taken from data source layer 132. Integrity files include code for scrubbing, validating, sampling, profiling, matching/de-duping and balance and control of data from data source layer 132. Loading includes transport, bulk load and message queues; integration includes merging and message queues; and metadata includes operational, business rules and meta-tagging of data from data source layer 132.

Data layer 136 includes the actual data that has been integrated by integration layer 134 from data source layer 132. Data source 136 includes an operational data store (Relational Database Management System—RDBMS, file system, normalized, detail/atomic, partitions), a data warehouse (RDBMS, dimensions, partitions, subject areas, aggregates, facts, history and archive), a data mart (RDBMS, Multidimensional Database Management System—MDBMS, star/snowflake), a Staging/Work Area (source extract, cleansing tables), a content management (including objects used for that purpose), metadata (hierarchies, reference data and documents about the data being used), and Enterprise Drill-Thru for mining out data for use in the compliance program.

Analytics layer 138 includes collaboration files 139a, which include mail, messaging, co-browsing and annotation services that allows employees of the enterprise to use to communicate evaluations of data being used or being proposed for use in the compliance program.

Delivery services 139b includes a report server, a report generator, a report cache, a renderer, load balancing, agents and publish/subscribe software. Report generator creates reports describing what data is needed, as well as the current status of a compliance program (including whether data being used is current for a current version of a regulation/standard).

Investigative services 139c includes a query dispatcher, an Online Analytical Processing (OLAP) server engine, an RDBMS OLAP extender, visualization (graphics producing) software, data mining (for mining data out of the data layer 136), and searching (searching for data in data source layer 132).

Embedded services 139d includes a predictive modeling software (for predicting whether data to be used is appropriate for regulation compliance), simulation of the compliance program, mining runtime, real-time modeling of the compliance program, and industry specific software used in the compliance program.

Metadata 139e is used to control the navigation, personalization, security and semantic layer for data used in the compliance program.

"Top" layer 140 provides access to reports and other resources from the analytics layer 138 via web browsers, portals, on-site devices, etc.

Thus, by structuring the layers of layer structure 130 as described, data needed and used by an enterprise for compliance with a regulation/standard provides resilience, structured workflow, security, privacy and a detailed infrastructure used by the enterprise.

Figure 2A:
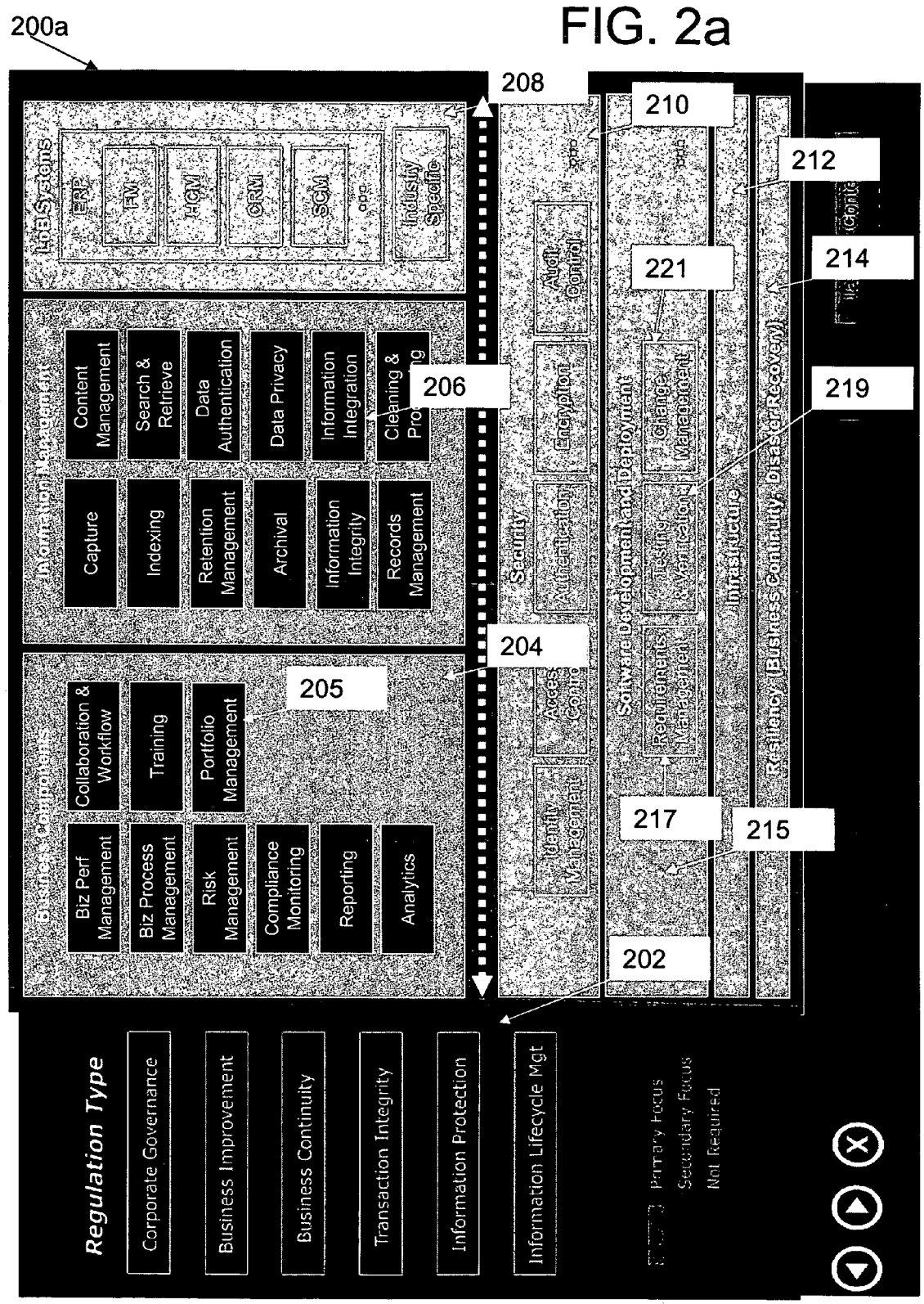
FIG. 2*a* is an exemplary Graphical User Interface (GUI) showing a relationship in the risk and compliance framework between regulations types and business components, information management components, Line of Business (LoB) systems, security, infrastructure and resiliency for an enterprise.

Referring now to FIG. 2a, a Graphical User Interface (GUI) 200a is presented. GUI 200a includes hot buttons 202, which represent the different regulation types shown above in FIG. 1a. Also includes in GUI 200a are Business Components 204, Information Management Components 206, Line of Business (LoB) Systems 208, Security systems 210, Infrastructure 212, and Resiliency 214 that may be applicable to a particular enterprise.

Note that within Business Components 204 is Portfolio Management 205, which includes the ability to prioritize, manage, and document progress across multiple Information Technology (IT) projects, portfolios and programs. For example, Portfolio Management 205 may include the prioritization and documentation of progress in meeting Sarbanes-Oxley (SOX) compliance requirements across a portfolio of internally developed and packaged applications, including CRM and ERP systems.

Representative elements in the components described in GUI 200a are as depicted. Note that ERP stands for "Enterprise Resource Planning," FM stands for "Finance Management," HCM stands for "Human Capital Management," CRM stands for "Customer Relations Management," and SCM stands for "Supply Chain Management."

GUI 200a also includes Software Development and Deployment (SDD) 215, which applies to all elements of the common data framework. SDD 215 encompasses the creation, integration and deployment of custom software, packaged applications, and existing (legacy) software.

Within SDD 215 are Requirements Management (RM) 217, Testing & Verification (TV) 219, and Change Management (CM) 221.

RM 217 includes the ability to elicit and manage software requirements, model software applications, and define user interactions (use cases) with applications. For example, RM 217 can mitigate risk for SOX compliance in a credit and collections application by capturing required changes to software systems. RM 217 can also define user interactions (user cases) of a proposed system, in preparation for software coding and testing.

TV 219 includes the ability to validate the functionality and performance of software applications against requirements. This includes manual, functional and performance (load) testing. For example, TV 219 may verify that audit trail requirements for financial applications meet functional and performance requirements, and continue to perform as expected under peak loads.

CM 221 includes the ability to manage, control and document changes to software throughout the development and deployment lifecycle, thereby improving the integrity and security of the software development environment. For example, CM 221 may capture electronic signature and audit trail information to document that all software changes were performed for valid business reasons by authorized personnel, and that the software developed was actually delivered.

Figure 2B:
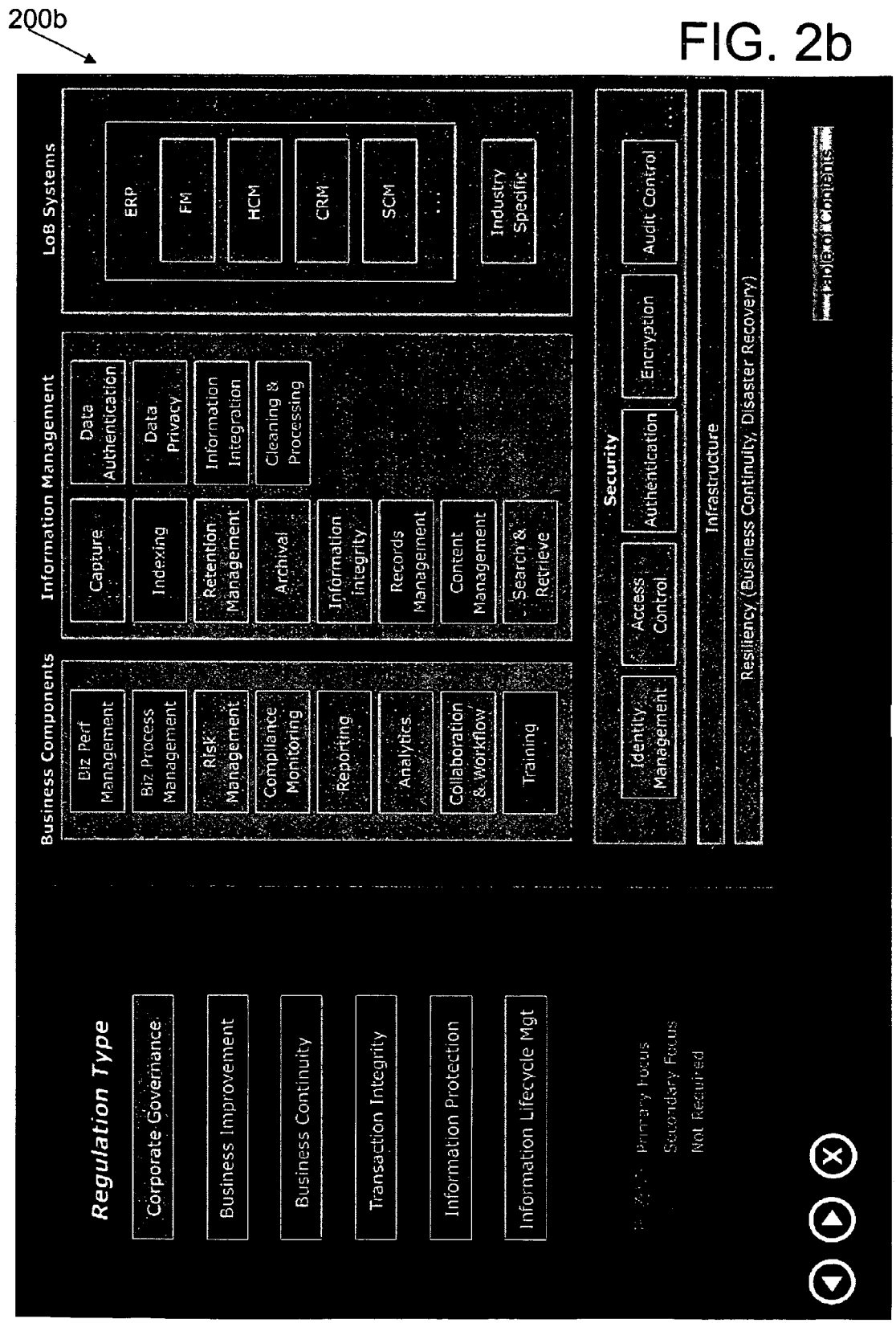
FIG. 2b is the GUI shown in FIG. 2a, further showing which business components are information management components are needed for compliance with a "Corporate Governance" regulation type.

Referring to FIG. 2*b*, assume that an enterprise is interested in "Corporate Governance" regulation compliance. By clicking the hot button labeled "Corporate Governance," GUI 200*b* shows that almost all components of "Business Components" and "Information Management" are shown as being either a Primary Focus or a Secondary Focus when developing a compliance program. The sole component that is not required is shown as "Cleaning and Processing" of data, including data extraction, transformation, transfer, and loading.

Figure 2C:
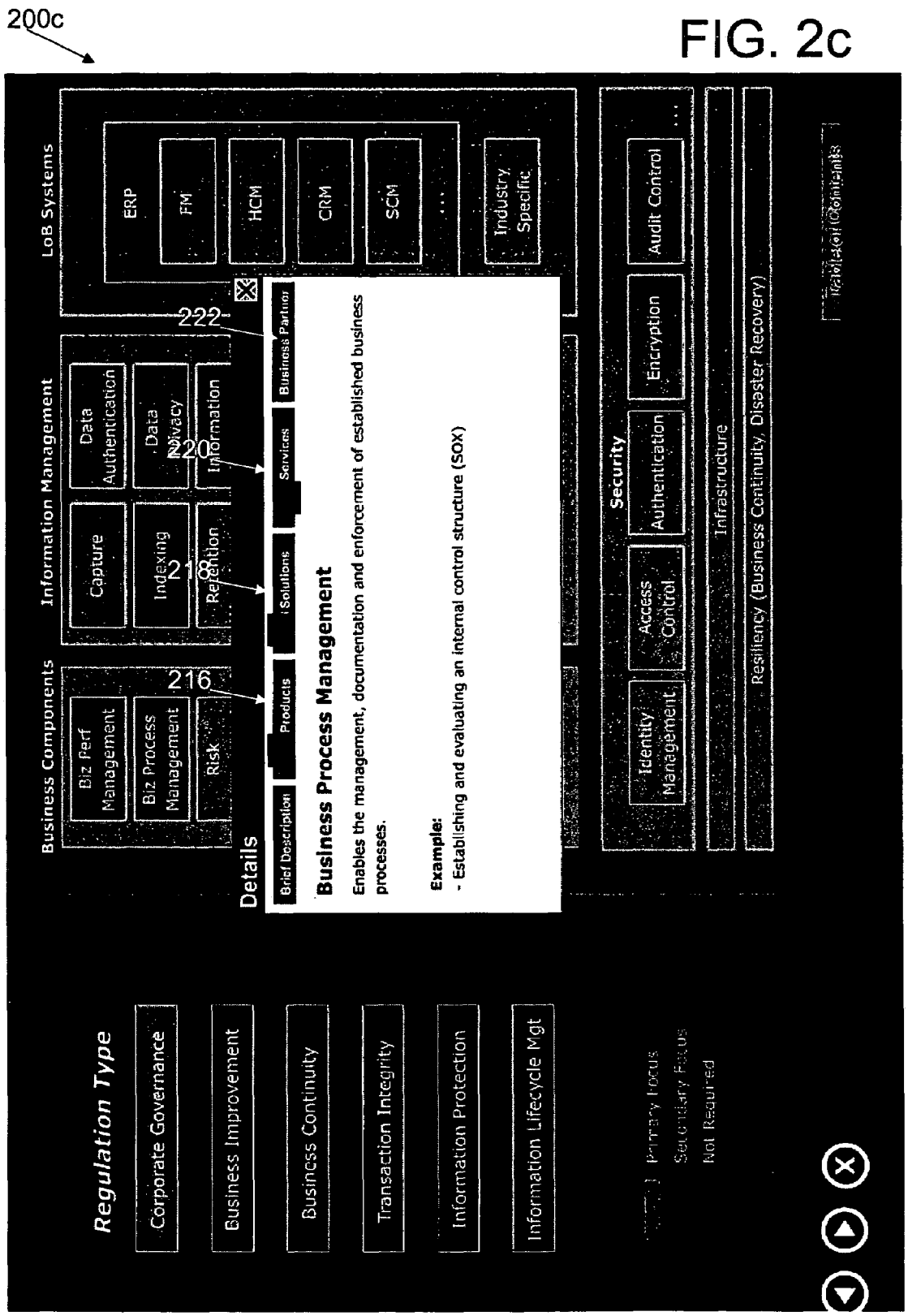
FIG. 2c is the GUI shown in FIG. 2b, further showing a pop-up on-screen menu showing additional details about a selected "Business Process Management" business component.
Figure 2D:
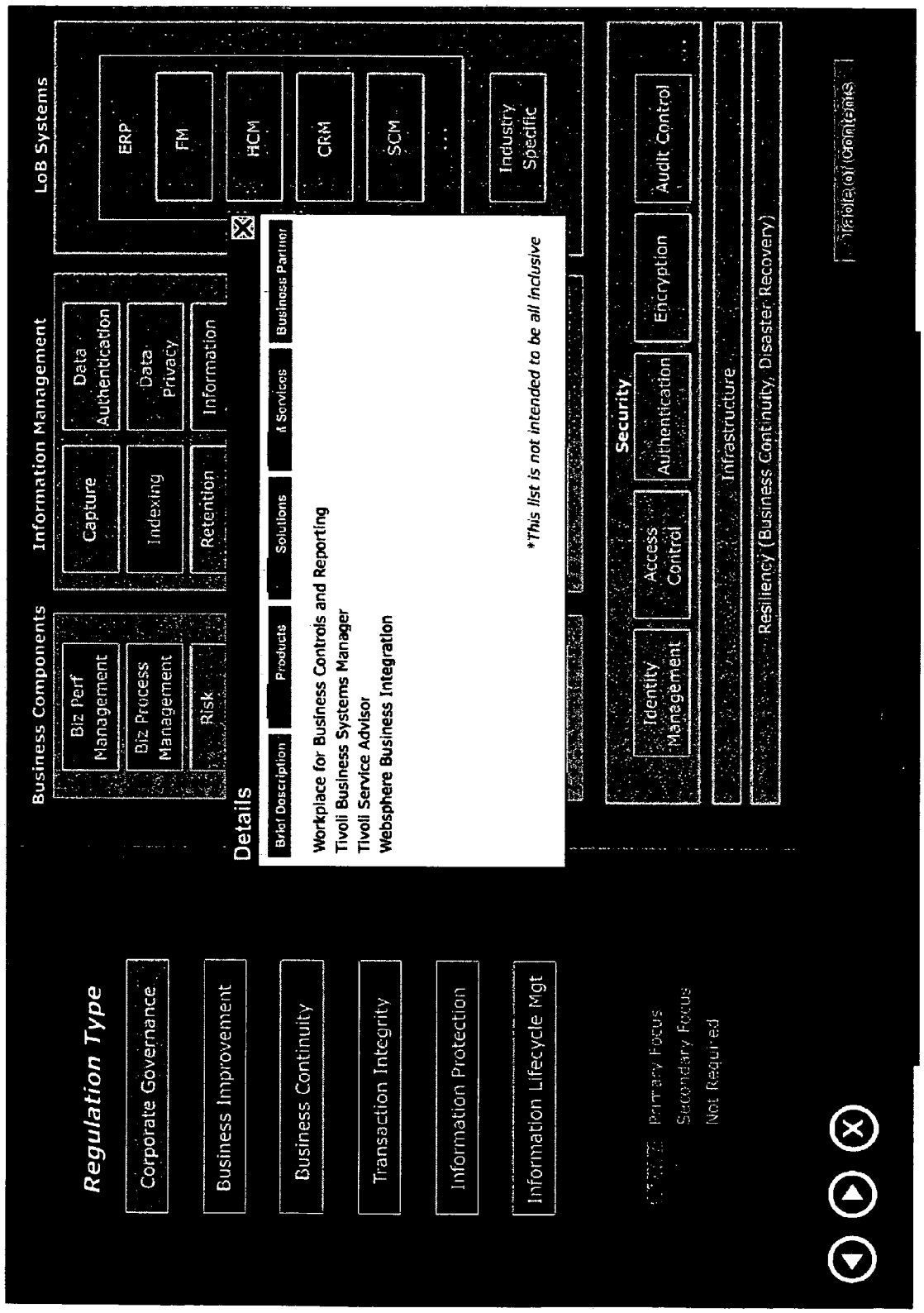
FIG. 2d is the GUI shown in FIG. 2c, further showing vendor products that can be used to meet the "Business Process Management" requirement for regulatory compliance.

As shown by GUI 200*c* in FIG. 2*c*, clicking the "Biz Process Management" button provides additional detail describing what "Business Process Management" means. Also included are hot buttons for vendor products (button 216), vendor solutions (button 218), vendor services (button 220), and business partners (button 222) who can assist the enterprise in coming into compliance with particular regulations/standards (all buttons shown in FIG. 2*c*).

For example, by clicking button 216, a listing of software products can be displayed (GUI 200*d*) on-line, with or without hot-links to the listed products, which can be used in establishing a "Business Process Management" component to comply with a Corporate Governance regulation.

Note that while the GUIs 200*a-d* depict the types of software packages that may be used to create and build the Risk and Compliance Framework 122 (as shown in FIG. 1*c*), the actual Risk and Compliance Framework 122 is the hardware/software infrastructure that is ultimately created based on elements selected from GUIS 200*a-d*.

Figure 3:
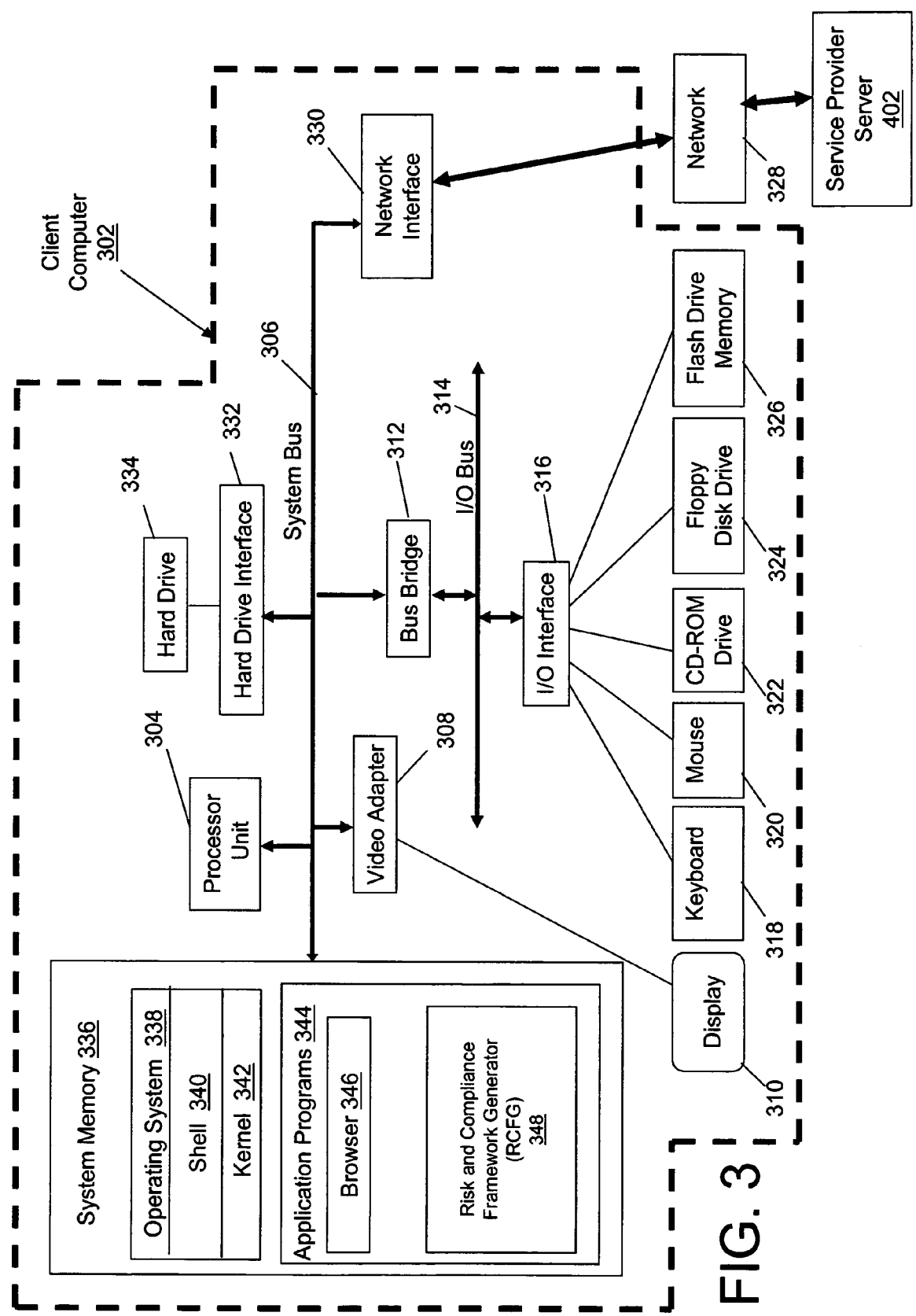
FIG. 3 illustrates an exemplary computer in which the present invention may be implemented.

With reference now to FIG. 3, there is depicted a block diagram of an exemplary client computer 302, in which the present invention may be utilized. Client computer 302 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk-Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Client computer 302 is able to communicate with a service provider server 402 via a network 328 using a network interface 330, which is coupled to system bus 306. Network 328 may be an external network such as the Internet, or an internal network such as an Ethernet or a Virtual Private Network (VPN).

A hard drive interface 332 is also coupled to system bus 306. Hard drive interface 332 interfaces with a hard drive 334. In a preferred embodiment, hard drive 334 populates a system memory 336, which is also coupled to system bus 306. Data that populates system memory 336 includes client computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a browser 346. Browser 346 includes program modules and instructions enabling a World Wide Web (WWW) client (i.e., client computer 302) to send and receive network messages to the Internet using HyperText Transfer Protocol (HTTP) messaging, thus enabling communication with service provider server 402.

Application programs 344 in client computer 302's system memory also include a Risk and Compliance Framework Generator (RCFG) 348. RCFG 348 includes code for implementing the processes described in FIGS. 1*b*-2*d*, including the generation of GUI's 200*a-d* shown in respective FIGS. 2*a-d*. In one embodiment, client computer 302 is able to download RCFG 348 from service provider server 402.

The hardware elements depicted in client computer 302 are not intended to be exhaustive, but rather are representative to highlight essential components required by the present invention. For instance, client computer 302 may include alternate memory storage devices such as magnetic cassettes, Digital Versatile Disks (DVDs), Bernoulli cartridges, and the like. These and other variations are intended to be within the spirit and scope of the present invention.

Figure 4:
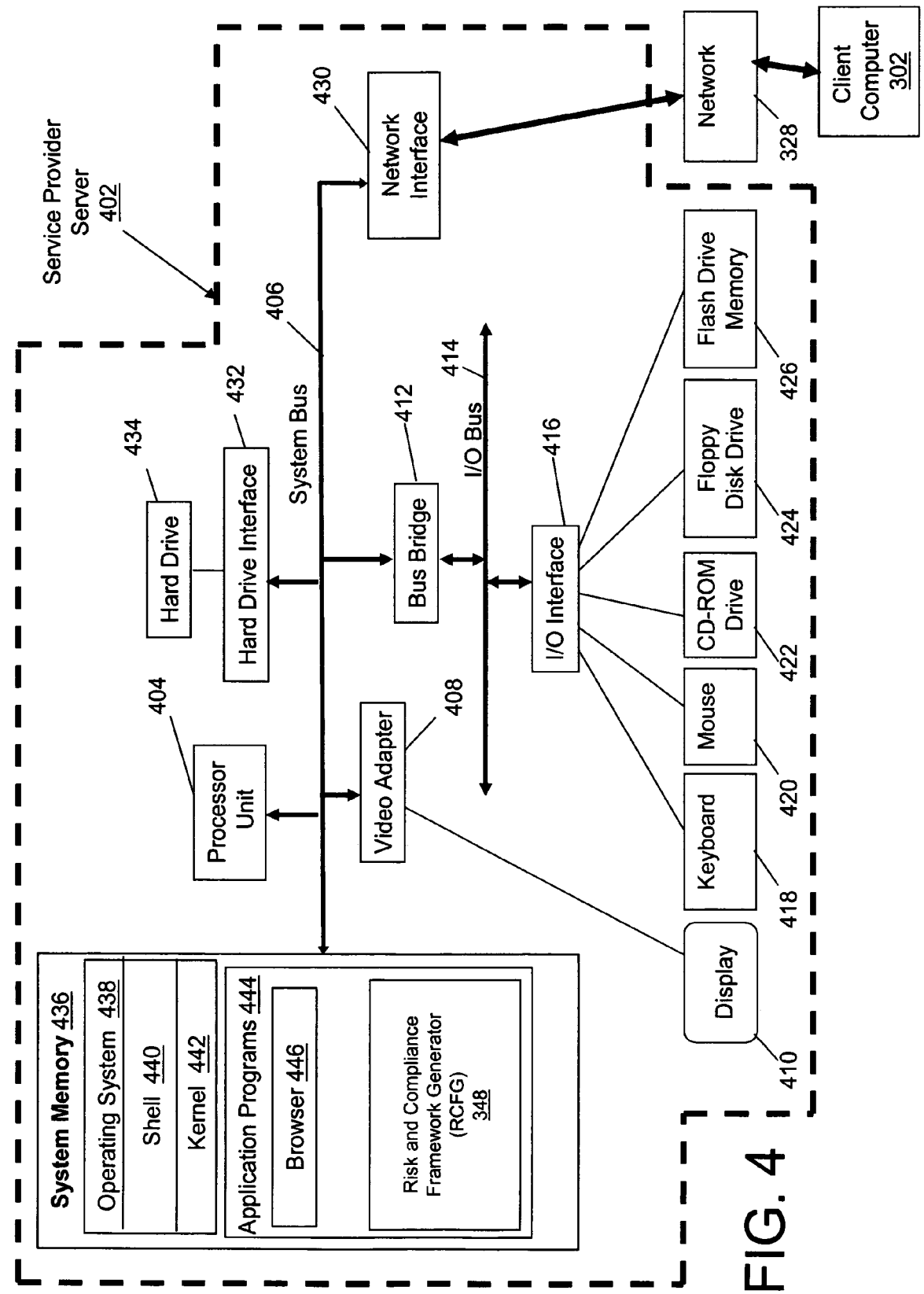
FIG. 4 depicts an exemplary server from which software for executing the present invention may be deployed.

As noted above, RCFG 348 can be downloaded to client computer 302 from service provider server 402, shown in exemplary form in FIG. 4. Service provider server 402 includes a processor unit 404 that is coupled to a system bus 406. A video adapter 408 is also coupled to system bus 406. Video adapter 408 drives/supports a display 410. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk-Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Service provider server 402 is able to communicate with client computer 302 via network 328 using a network interface 430, which is coupled to system bus 406. Access to network 328 allows service provider server 402 to deploy RCFG 348 to client computer 302.

System bus 406 is also coupled to a hard drive interface 432, which interfaces with a hard drive 434. In a preferred embodiment, hard drive 434 populates a system memory 436, which is also coupled to system bus 406. Data that populates system memory 436 includes service provider server 402's operating system 438, which includes a shell 440 and a kernel 442. Shell 440 is incorporated in a higher level operating system layer and utilized for providing transparent user access to resources such as application programs 444, which include a browser 446, and a copy of RCFG 348 described above, which can be deployed to client computer 302.

The hardware elements depicted in service provider server 402 are not intended to be exhaustive, but rather are representative to highlight essential components required by the present invention. For instance, service provider server 402 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 402 performs all of the functions associated with the present invention (including execution of RCFG 348), thus freeing client computer 302 from having to use its own internal computing resources to execute RCFG 348.

It should be understood that at least some aspects of the present invention may be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the process described by the present invention, including the functions of RCFG 348, is performed by service provider server 402. Alternatively, RCFG 348 and the method described herein, and in particular as shown and described in FIGS. 1b-2d, can be deployed as a process software from service provider server 402 to client computer 302. Still more particularly, process software for the method so described may be deployed to service provider server 402 by another service provider server (not shown).

Figure 5A:
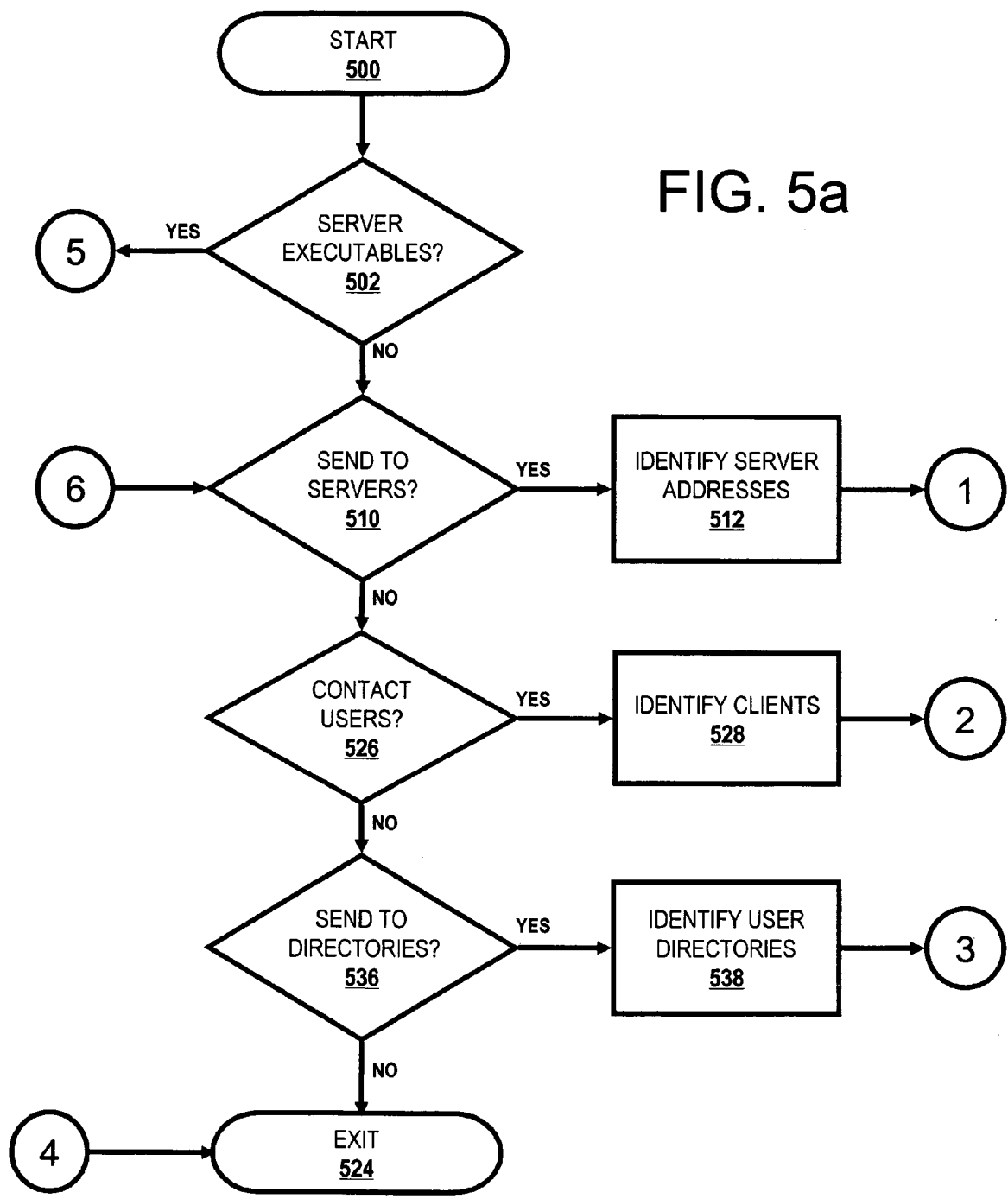

Referring then to FIG. 5, step 500 begins the deployment of the process software. The first thing is to determine if there are any programs that will reside on a server or servers when the process software is executed (query block 502). If this is the case, then the servers that will contain the executables are identified (block 504). The process software for the server or servers is transferred directly to the servers' storage via File Transfer Protocol (FTP) or some other protocol or by copying though the use of a shared file system (block 506). The process software is then installed on the servers (block 508).

Next, a determination is made on whether the process software is to be deployed by having users access the process software on a server or servers (query block 510). If the users are to access the process software on servers, then the server addresses that will store the process software are identified (block 512).

A determination is made if a proxy server is to be built (query block 514) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 516). The process software is sent to the servers either via a protocol such as FTP or it is copied directly from the source files to the server files via file sharing (block 518). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 520). Another embodiment is to have the servers automatically copy the process software to each client and then run the installation program for the process software at each client computer. The user executes the program that installs the process software on his client computer (block 522) then exits the process (terminator block 524).

In query step 526, a determination is made whether the process software is to be deployed by sending the process software to users via e-mail. The set of users where the process software will be deployed are identified together with the addresses of the user client computers (block 528). The process software is sent via e-mail to each of the users' client computers (block 530). The users then receive the e-mail (block 532) and then detach the process software from the e-mail to a directory on their client computers (block 534). The user executes the program that installs the process software on his client computer (block 522) then exits the process (terminator block 524).

Lastly a determination is made on whether to the process software will be sent directly to user directories on their client computers (query block 536). If so, the user directories are identified (block 538). The process software is transferred directly to the user's client computer directory (block 540). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 542). The user executes the program that installs the process software on his client computer (block 522) and then exits the process (terminator block 524).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process of placing an entire packet within another packet and sending it over a network. The protocol of the outer packet is understood by The network and both points, called tunnel interfaces, where the packet enters and exits the network.

Figure 6C:
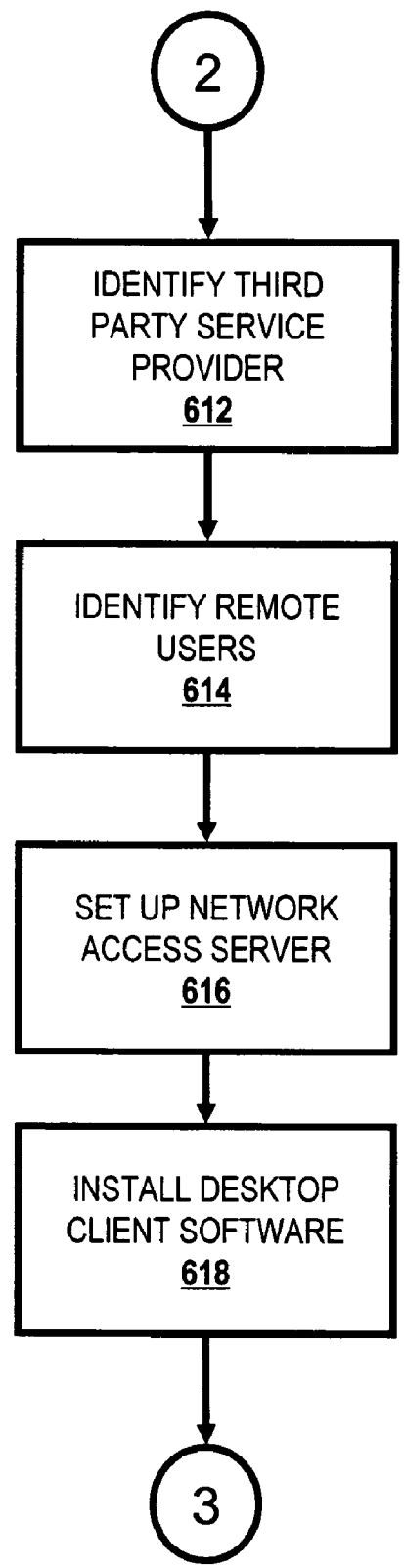

The process for such VPN deployment is described in FIG. 6. Initiator block 602 begins the Virtual Private Network (VPN) process. A determination is made to see if a VPN for remote access is required (query block 604). If it is not required, then proceed to (query block 606). If it is required, then determine if the remote access VPN exists (query block 608).

If a VPN does exist, then proceed to block 610. Otherwise identify a third party provider that will provide the secure, encrypted connections between the company's private network and the company's remote users (block 612). The company's remote users are identified (block 614). The third party provider then sets up a network access server (NAS) (block 616) that allows the remote users to dial a toll free number or attach directly via a broadband modem to access, download and install the desktop client software for the remote-access VPN (block 618).

After the remote access VPN has been built or if it been previously installed, the remote users can access the process software by dialing into the NAS or attaching directly via a cable or DSL modem into the NAS (block 610). This allows entry into the corporate network where the process software is accessed (block 620). The process software is transported to the remote user's desktop over the network via tunneling. That is the process software is divided into packets and each packet including the data and protocol is placed within another packet (block 622). When the process software arrives at the remote user's desk-top, it is removed from the packets, reconstituted and then is executed on the remote users desk-top (block 624).

A determination is then made to see if a VPN for site to site access is required (query block 606). If it is not required, then proceed to exit the process (terminator block 626). Otherwise, determine if the site to site VPN exists (query block 628). If it does exist, then proceed to block 630. Otherwise, install the dedicated equipment required to establish a site to site VPN (block 638). Then build the large scale encryption into the VPN (block 640).

After the site to site VPN has been built or if it had been previously established, the users access the process software via the VPN (block 630). The process software is transported to the site users over the network via tunneling (block 632). That is the process software is divided into packets and each packet including the data and protocol is placed within another packet (block 634). When the process software arrives at the remote user's desktop, it is removed from the packets, reconstituted and is executed on the site users desktop (block 636). The process then ends at terminator block 626.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 7A:
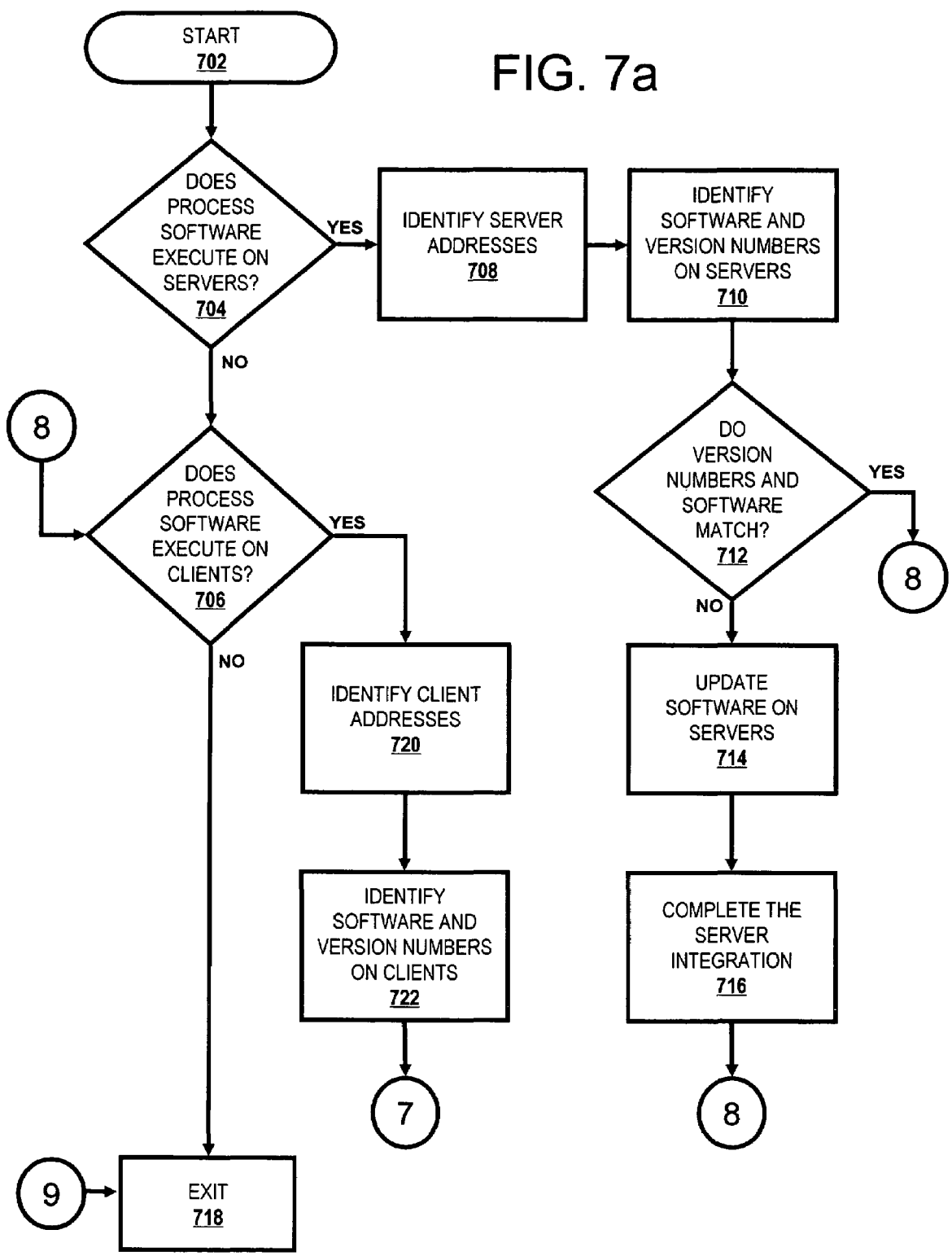
FIGS. 7a-b show a flow-chart showing steps taken to integrate into an computer system software that is capable of executing the steps shown and described in FIGS. 1b-2d.
Figure 7B:
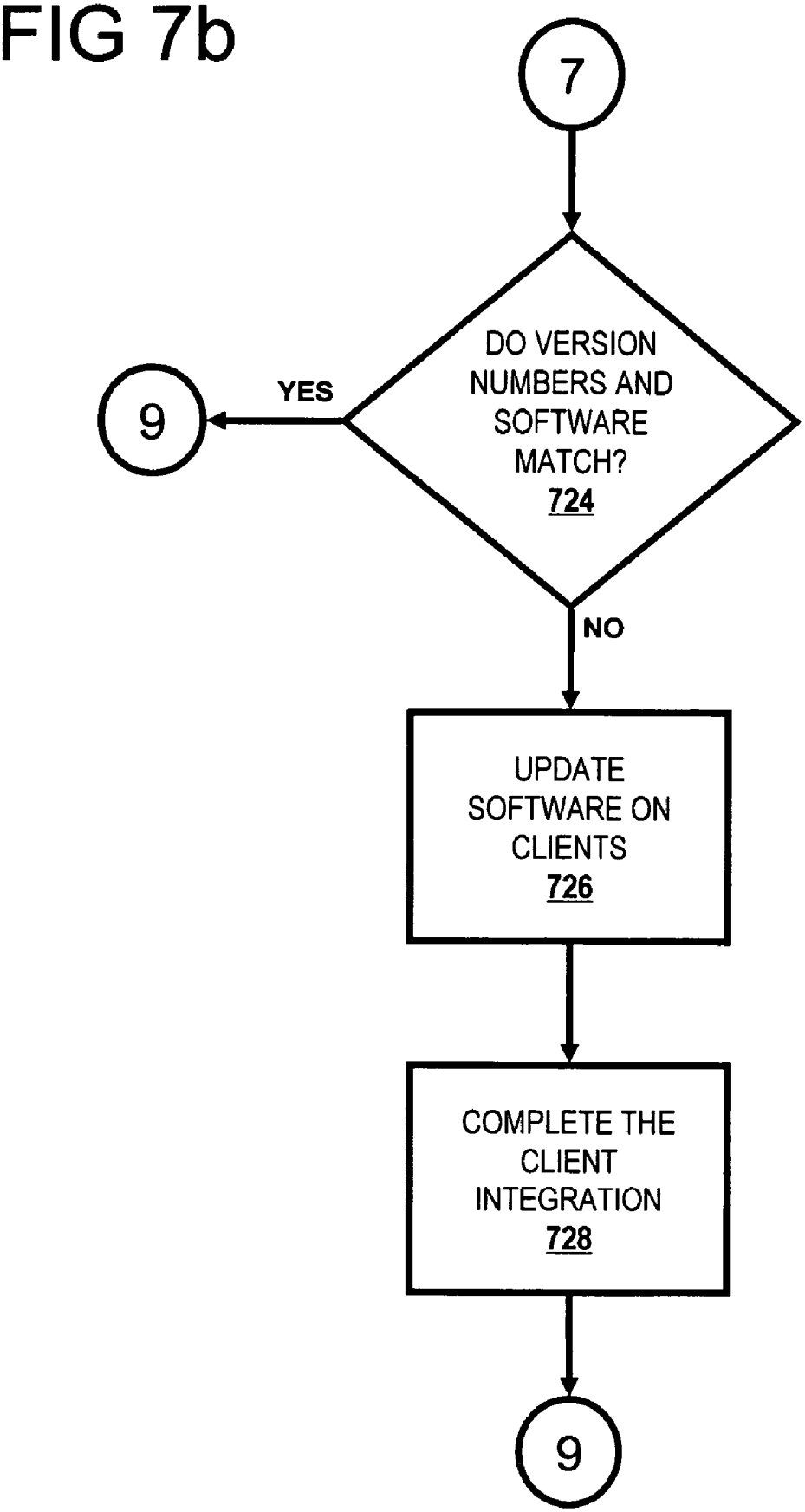

For a high-level description of this process, reference is now made to FIG. 7. Initiator block 702 begins the integration of the process software. The first tiling is to determine if there are any process software programs that will execute on a server or servers (block 704). If this is not the case, then integration proceeds to query block 706. If this is the case, then the server addresses are identified (block 708). The servers are checked to see if they contain software that includes the operating system (OS), applications, and network operating systems (NOS), together with their version numbers, which have been tested with the process software (block 710). The servers are also checked to determine if there is any missing software that is required by the process software in block 710.

A determination is made if the version numbers match the version numbers of OS, applications and NOS that have been tested with the process software (block 712). If all of the versions match and there is no missing required software the integration continues in query block 706.

If one or more of the version numbers do not match, then the unmatched versions are updated on the server or servers with the correct versions (block 714). Additionally, if there is missing required software, then it is updated on the server or servers in the step shown in block 714. The server integration is completed by installing the process software (block 716).

The step shown in query block 706, which follows either the steps shown in block 704, 712 or 716 determines if there are any programs of the process software that will execute on the clients. If no process software programs execute on the clients the integration proceeds to terminator block 718 and exits. If this not the case, then the client addresses are identified as shown in block 720.

The clients are checked to see if they contain software that includes the operating system (OS), applications, and network operating systems (NOS), together with their version numbers, which have been tested with the process software (block 722). The clients are also checked to determine if there is any missing software that is required by the process software in the step described by block 722.

A determination is made if the version numbers match the version numbers of OS, applications and NOS that have been tested with the process software (query block 724). If all of the versions match and there is no missing required software, then the integration proceeds to terminator block 718 and exits.

If one or more of the version numbers do not match, then the unmatched versions are updated on the clients with the correct versions (block 726). In addition, if there is missing required software then it is updated on the clients (also block 726). The client integration is completed by installing the process software on the clients (block 728). The integration proceeds to terminator block 718 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 8A:
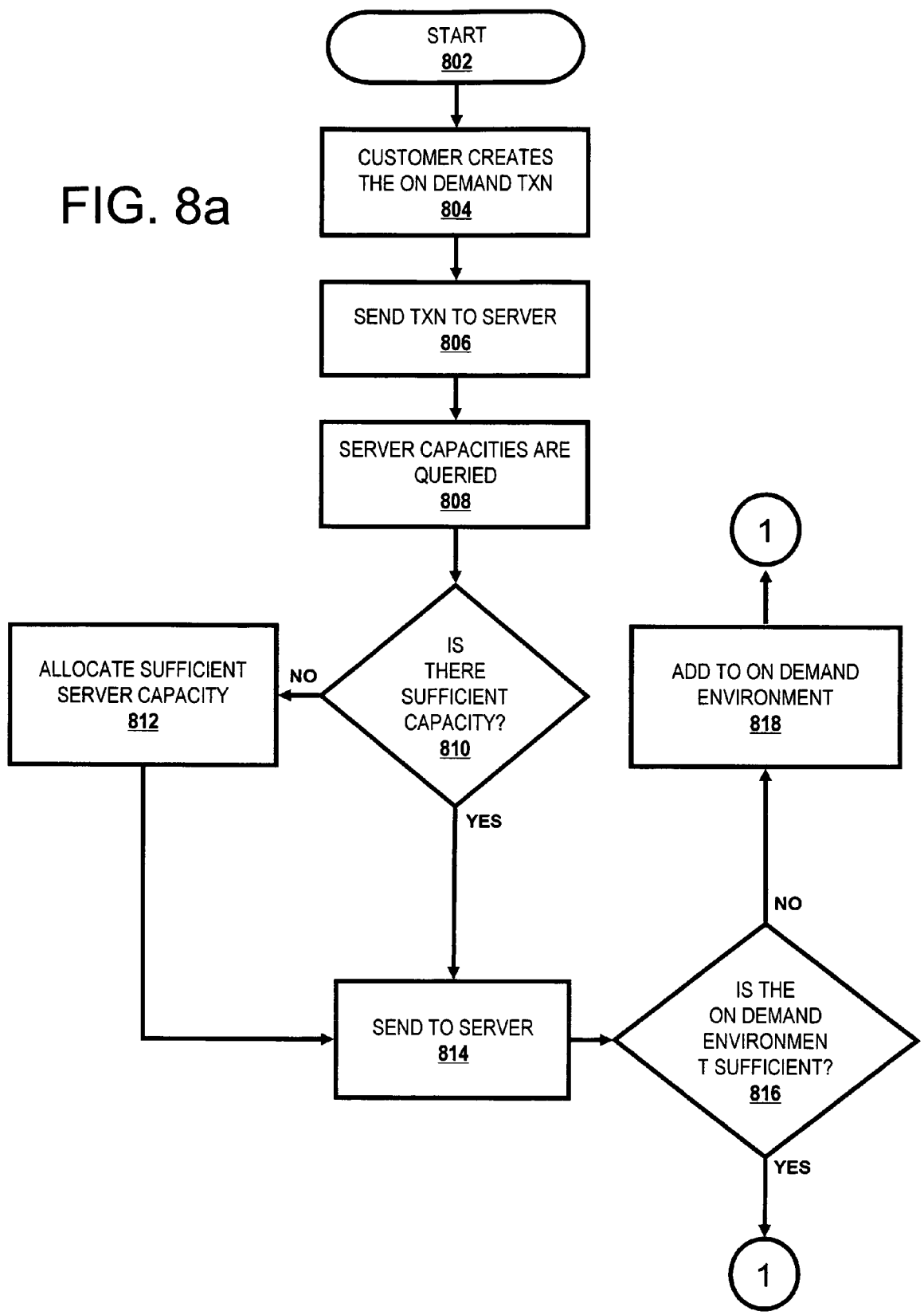
FIGS. 8a-b show a flow-chart showing steps taken to execute the steps shown and described in FIGS. 1b-2d using an on-demand service provider.
Figure 8B:
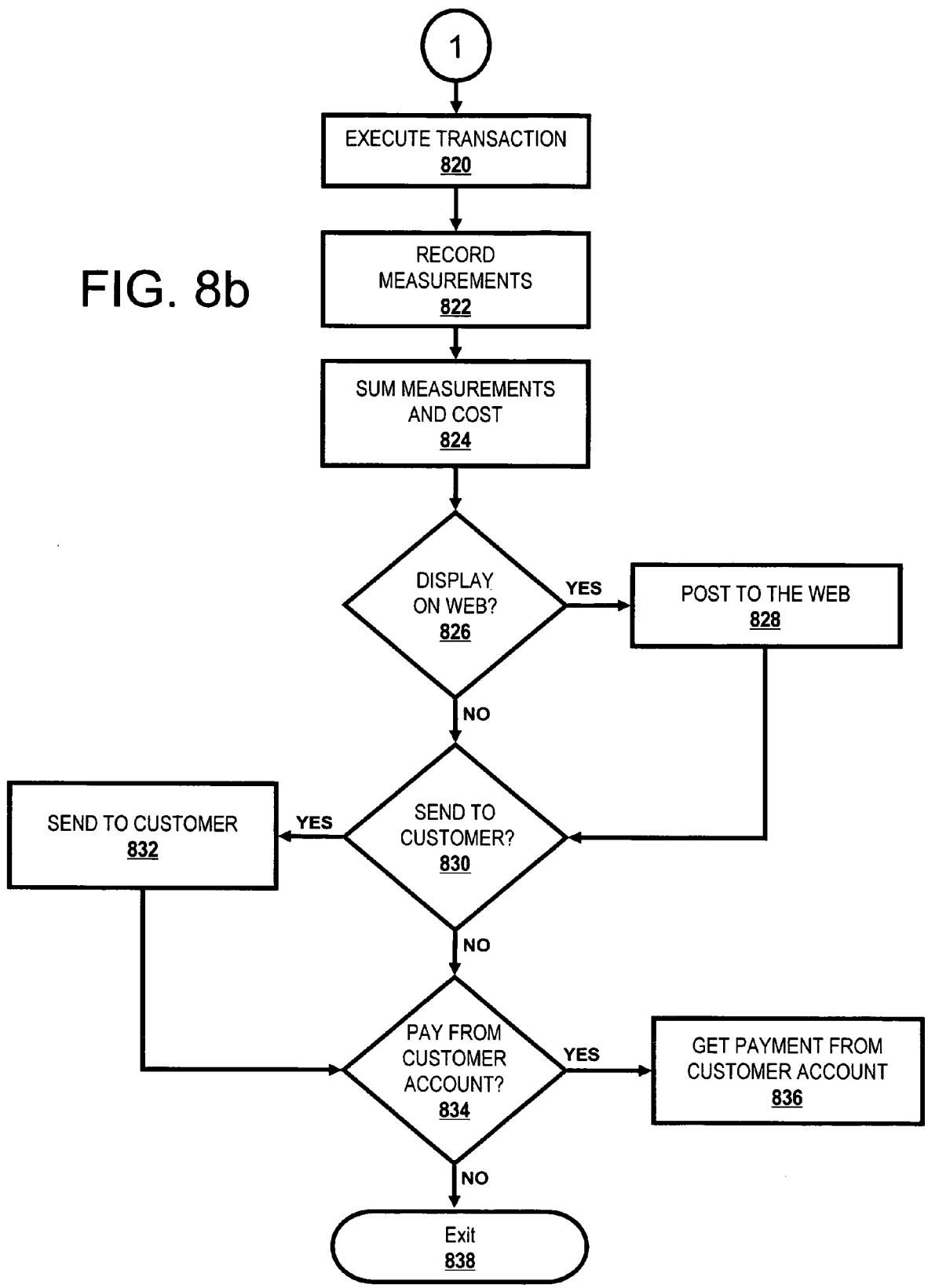

With reference now to FIG. 8, initiator block 802 begins the On Demand process. A transaction is created than contains the unique customer identification, the requested service type and any service parameters that further, specify the type of service (block 804). The transaction is then sent to the main server (block 806). In an On Demand environment the main server can initially be the only server, then as capacity is consumed other servers are added to the On Demand environment.

The server central processing unit (CPU) capacities in the On Demand environment are queried (block 808). The CPU requirement of the transaction is estimated, then the servers available CPU capacity in the On Demand environment are compared to the transaction CPU requirement to see if there is sufficient CPU available capacity in any server to process the transaction (query block 810). If there is not sufficient server CPU available capacity, then additional server CPU capacity is allocated to process the transaction (block 812). If there was already sufficient Available CPU capacity then the transaction is sent to a selected server (block 814).

Before executing the transaction, a check is made of the remaining On Demand environment to determine if the environment has sufficient available capacity for processing the transaction. This environment capacity consists of such things as but not limited to network bandwidth, processor memory, storage etc. (block 816). If there is not sufficient available capacity, then capacity will be added to the On Demand environment (block 818). Next the required software to process the transaction is accessed, loaded into memory, then the transaction is executed (block 820).

The usage measurements are recorded (block 822). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 824).

If the customer has requested that the On Demand costs be posted to a web site (query block 826), then they are posted (block 828). If the customer has requested that the On Demand costs be sent via e-mail to a customer address (query block 830), then these costs are sent to the customer (block 832). If the customer has requested that the On Demand costs be paid directly from a customer account (query block 834), then payment is received directly from the customer account (block 836). The On Demand process is then exited at terminator block 838.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data. Similarly, while the term "regulation" and "standard" have been described as mutually different and unique, for purposes of the appended claims, the term "regulation" is defined to include both "regulation" and "standard" unless stated otherwise.

What is claimed is:

1. A computer-implementable method executed by at least one processor in a computer system, the computer-implementable method comprising:
   generating a common data framework that includes multiple data structures derived from different applications that are associated with different data sources within an enterprise, wherein the different data sources contain data from different data categories;
   receiving a selection of a regulation that the enterprise is required to comply with, wherein the regulation comprises one or more of a legislative regulation, established standard, codes and business policies;
   enabling selective determination of which specific data from among a larger set of data is required for the enterprise to be in compliance with the selected regulation; and
   extracting, from the common data framework, needed data that is needed for the enterprise to be in compliance with the selected regulation;
   wherein the common data framework includes a layer structure that includes:
      a data source layer, wherein the data source layer includes unstructured data, informational data and external data, wherein the unstructured data comprises video files and web logs, wherein the informational data comprises spreadsheets, and wherein the external data comprises web crawling files;
      an integration layer, wherein the integration layer includes extraction files, transformation files, integrity files, synchronization files, loading files, integration files and metadata files, wherein the extraction files comprise an extraction engine, file/data capture software, parsing code, mapping code, and pre-defined incremental procedures, wherein the transformation files comprise translation files, calculation files, aggregation files and enrichment files used to manipulate the data taken from the data source layer, wherein the integrity files include code for scrubbing, validating, sampling, profiling, matching/de-duping, balancing and controlling data from the data source layer, wherein the loading files include bulk load and message queues, wherein the integration files include merging and message queues, and wherein the metadata files include business rules and meta-tagging of data from the data source layer;
      a data layer that includes data that the integration layer extracted and transformed from the data source layer to obtain data used in an enterprise's regulation/standard compliance program;
      an analytics layer that utilizes data from the data layer to create the enterprise's regulation/standard compliance program; and
      an access layer to provide access to the enterprise's regulation/standard compliance program.

2. The computer-implementable method of claim 1, wherein the needed data is required by the selected regulation to be kept confidential within the enterprise, and wherein the needed data is certified as being data that is kept confidential within the enterprise in order to be in compliance with the selected regulation.

3. The computer-implementable method of claim 1, wherein the needed data is certified as being data that is required by the enterprise to certify that the enterprise is in compliance with the selected regulation, and wherein data that is certified is in a data format that is required by the selected regulation.

4. The computer-implementable method of claim 1, wherein the needed data is certified as being data that is required by the enterprise to forensically prove the validity of the needed data.

5. The computer-implementable method of claim 4, wherein the validity of the needed data is proven by proving that the needed data has not been altered.

6. The computer-implementable method of claim 1, further comprising:
   providing a Graphical User Interface (GUI) that graphically depicts which data structures are needed to place the enterprise in compliance with the selected regulation, wherein the data structures that are needed are prioritized as being a primary focus or a secondary focus according to significance of data in the data structures for compliance with the selected regulation; and
   visually coding the data structures according to the primary focus and the secondary focus.

7. The computer-implementable method of claim 6, further comprising:
   providing an on-screen menu for at least one data structure depicted in the GUI, wherein the on-screen menu depicts at least one software application available from a vendor that provides the at least one data structure needed to place the enterprise in compliance with the selected regulation.

8. A system comprising:
   a processor;
   a data bus coupled to the processor;
   a memory coupled to the data bus; and
   a computer-usable medium embodying computer program code, the computer program code comprising instructions executable by the processor and configured to:
      generate a common data framework that includes multiple data structures derived from separate applications and data sources within an enterprise;
      receive a selection of a regulation which the enterprise is to comply with;
      automatically determine specific data from among a larger set of data, which specific data is required by the enterprise to be in compliance with the regulation; and
      extract needed data for compliance from the common data framework;
      wherein the common data structure includes a layer structure that includes:
         a data source layer, wherein the data source layer includes unstructured data, informational data and external data, wherein the unstructured data comprises video files and web logs, wherein the informational data comprises spreadsheets, and wherein the external data comprises web crawling files;

an integration layer, wherein the integration layer includes extraction files, transformation files, integrity files, synchronization files, loading files, integration files and metadata files, wherein the extraction files comprise an extraction engine, file/data capture software, parsing code, mapping code, and pre-defined incremental procedures, wherein the transformation files comprise translation files, calculation files, aggregation files and enrichment files used to manipulate the data taken from the data source layer, wherein the integrity files include code for scrubbing, validating, sampling, profiling, matching/de-duping, balancing and controlling data from the data source layer, wherein the loading files include bulk load and message queues, wherein the integration files include merging and message queues, and wherein the metadata files include business rules and meta-tagging of data from the data source layer;

a data layer that includes data that the integration layer extracted and transformed from the data source layer to obtain data used in an enterprise's regulation/standard compliance program;

an analytics layer that utilizes data from the data layer to create the enterprise's regulation/standard compliance program; and an access layer to provide access to the enterprise's regulation/standard compliance program.

9. The system of claim 8, wherein the computer program code further comprises instructions executable by the processor and configured to:

provide a Graphical User Interface (GUI) that graphically depicts which data structures are needed to place the enterprise in compliance with the regulation.

10. The system of claim 9, wherein the computer program code further comprises instructions executable by the processor and configured to:

provide an on-screen menu for at least one data structure depicted in the GUI, wherein the on-screen menu depicts at least one software application available from a vendor that provides the at least one data structure needed to place the enterprise in compliance with the regulation.

11. A tangible computer-usable medium on which is stored computer program code, the computer program code comprising computer executable instructions configured to:

generate a common data framework that includes multiple data structures for multiple applications;

receive a selection of a regulation to be complied with by an enterprise;

determine which data is needed by the enterprise to be in compliance with the regulation; and extract needed data for compliance from the common data framework, wherein the common data framework includes a layer structure that includes:

a data source layer, wherein the data source layer includes unstructured data, informational data and external data, wherein the unstructured data comprises video files and web logs, wherein the informational data comprises spreadsheets, and wherein the external data comprises web crawling files;

an integration layer, wherein the integration layer includes extraction files, transformation files, integrity files, synchronization files, loading files, integration files and metadata files, wherein the extraction files comprise an extraction engine, file/data capture software, parsing code, mapping code, and pre-defined incremental procedures, wherein the transformation files comprise translation files, calculation files, aggregation files and enrichment files used to manipulate the data taken from the data source layer, wherein the integrity files include code for scrubbing, validating, sampling, profiling, matching/de-duping, balancing and controlling data from the data source layer, wherein the loading files include bulk load and message queues, wherein the integration files include merging and message queues, and wherein the metadata files include business rules and meta-tagging of data from the data source layer;

a data layer that includes data that the integration layer extracted and transformed from the data source layer to obtain data used in an enterprise's regulation/standard compliance program;

an analytics layer that utilizes data from the data layer to create the enterprise's regulation/standard compliance program; and an access layer to provide access to the enterprise's regulation/standard compliance program.

12. The tangible computer-useable medium of claim 11, wherein the computer program code further comprises computer executable instructions configured to:

provide a Graphical User Interface (GUI) that graphically depicts which data structures are certified as being needed to place the enterprise in compliance with the regulation.

13. The tangible computer-useable medium of claim 12, wherein the computer program code further comprises computer executable instructions configured to:

provide an on-screen menu for at least one data structure depicted in the GUI, wherein the on-screen menu depicts at least one software application available from a vendor that provides the at least one data structure needed to place the enterprise in compliance with the regulation.

14. The tangible computer-usable medium of claim 11, wherein the needed data is data that is required by the enterprise to establish business controls needed to be in compliance with the regulation.

15. The tangible computer-useable medium of claim 11, wherein the needed data is data that is required by the enterprise to certify that the enterprise is in compliance with the regulation.

16. The method of claim 1, wherein the common data framework is a federated data structure in which data is physically stored in separate files, and wherein the separate files are logically connected through logical connectors.

17. The computer-implementable method of claim 1, wherein the different applications include a first application and a second application, and wherein the first application includes a database storing data/information representing accidents suffered within the enterprise, and wherein the second application includes a database storing employee records of employees of the enterprise.

18. The tangible computer-useable medium of claim 11, wherein the computer program code is deployed to a client computer from a server at a remote location.

19. The tangible computer-useable medium of claim 11, wherein the computer program code is provided by a service provider to a customer on an on-demand basis.

* * * * *